(12) United States Patent
Wiand

(10) Patent No.: US 7,195,351 B2
(45) Date of Patent: Mar. 27, 2007

(54) PHOTOCHROMIC EYEGLASS FRAMES AND THEIR METHOD OF MAKING

(75) Inventor: Ronald C. Wiand, Troy, MI (US)

(73) Assignee: Soft Light, Inc., Troy, MI (US)

( * ) Notice: Subject to any disclaimer, the term of this patent is extended or adjusted under 35 U.S.C. 154(b) by 0 days.

(21) Appl. No.: 11/122,752

(22) Filed: May 5, 2005

(65) Prior Publication Data

US 2006/0250569 A1    Nov. 9, 2006

(51) Int. Cl.
*G02C 11/02* (2006.01)

(52) U.S. Cl. .......................... 351/51; 351/52; 351/111; 351/124

(58) Field of Classification Search .................. 351/41, 351/44, 51, 52, 83, 111, 124
See application file for complete search history.

(56) References Cited

U.S. PATENT DOCUMENTS 6,224,208 B1 *    5/2001    Pawlowski .................. 351/51

FOREIGN PATENT DOCUMENTS

| FR | 2576117 | * | 7/1986 | .................. 351/41 |
| JP | 63-193128 | * | 8/1988 | .................. 351/51 |

* cited by examiner

*Primary Examiner*—Huy Mai
(74) *Attorney, Agent, or Firm*—Ronald L. Hofer

(57) ABSTRACT

An transparent or semitransparent plastic eyeglass frame contains a photochromic moiety and has photochromic properties.

8 Claims, 1 Drawing Sheet

PHOTOCHROMIC EYEGLASS FRAMES AND THEIR METHOD OF MAKING

CROSS-REFERENCE TO RELATED APPLICATIONS

This application claims priority to PCT application No. PCT/US04/43715 filed Dec. 30, 2004, which claims priority to U.S. Provisional Application Ser. No. 60/533,678 filed Dec. 31, 2003.

BACKGROUND OF THE INVENTION

The present invention relates to photochromic polymeric articles which are intended for use as eyeglass frames and to a method of making the articles. Preferred embodiments of the present invention relate to photochromic eyeglass frames incorporating interchangeable photochromic tubing and to photochromic eyeglass frames having photochromic lenses.

Ophthalmic and planar lenses having a photochromic nature have been known for many years. Such lenses offer both functional and aesthetic features. There has been much research and development in the field of polymeric or plastic lenses with photochromic molecules imbibed therein. Of course, eyeglasses having photochromic lenses have been popular because they have the ability to adjust the density of their tint. They are quite transparent and can be worn during low light conditions but they darken when exposed to sunlight or UV light. It is, of course, the photochromic material which has been added to, or coated onto, the lens which changes state under different light conditions to give the lens its photochromic nature.

Although plastic lenses with photochromic characteristics are well known and are advantageous, it would be desirable if improvements could be made relating to the aesthetic nature of the frames which hold the lenses. Plastic frames are relatively light in weight and can be flexible and resistant to breaking. In particular, it would be advantageous if frames could themselves be provided with a photochromic nature. It would be even more advantageous if the color of the frames could be readily changed as desired by the wearer to match, for example, clothing. It would be still more advantageous if the frames and lenses could be made to color match the clothing without changing the lenses or frames.

There remains a need for improvements in incorporating photochromic molecules into plastic articles such as eyeglass frames. The photochromic molecules used in plastic lenses are relatively large in size and are difficult to incorporate into a polymerized plastic polymeric matrix. Difficulties also arise if the polymeric matrix interferes with the changing of states of the photochromic molecule. In short, there remains a need for techniques or methods for providing articles such as eyeglass frames with photochromic characteristics. There is a need for a processes that provides large enough spaces within a substrate to accept relatively large photochromic molecules and allow the molecules to freely change state to thereby exhibit the full range of their photochromic performance. Furthermore, there remains a need for low cost methods. And there remains a need for further improvements in the longevity of the photochromic characteristic.

The present invention provides an improved method for imparting photochromic qualities to eyeglass frames. Some of the methods of this invention can be used in a small optical laboratory without use of complex or expensive equipment or process steps to provide photochromic eyeglass frames that rapidly change state, are resistant to damage due to heat or light, and have long life expectancies. Further understanding of this invention will be had from the following disclosure taken in conjunction with the claims.

BRIEF SUMMARY OF THE INVENTION

In the broadest aspect of the present invention, an eyeglass frame comprises at least a surface layer that has an organic polymeric matrix comprising a photochromic moiety. In a preferred embodiment, the eyeglass frame comprises tubing coaxially about a portion of at least one frame ear stem and the tubing is comprised of at least a surface layer of an organic polymeric matrix comprising a photochromic moiety. In another preferred embodiment the eyeglass frame is in combination with a photochromic lens, which is color complimentary thereto. In a most preferred embodiment, the eyeglass lens has exposed edge portions which absorb light from its surroundings so as to change color in response thereto.

In accordance with the method of the present invention, an eyeglass frame is made by the step of providing a polymeric plastic frame matrix comprising an effective amount of a photochromic moiety. The frame may be provided by: casting a suitable prepolymer with a selected photochromic moiety therein and then polymerizing the prepolymer; casting a suitable prepolymer and polymerizing to form a frame and then imbibing, coating, dipping, spraying etc a selected photochromic moiety thereon to provide the frame with a photochromic nature. Another method of providing the frame is to extrude a suitable prepolymer with a selected photochromic moiety therein or extrude a suitable prepolymer and then imbibe, coat, dip, spray or otherwise cover it with a selected photochromic moiety.

DETAILED DESCRIPTION OF THE INVENTION

The present invention is an eyeglass frame adapted to hold eyeglass lenses and comprising photochromic moiety. The frame may be provided by one of several different alternative methods. For example, the frame may be provided by: casting a suitable prepolymer with a selected photochromic moiety therein and then polymerizing the prepolymer; casting a suitable prepolymer and polymerizing to form a frame; molding or extruding a thermo-formable plastic and then imbibing, coating, dipping, spraying etc a selected photochromic moiety thereon to provide the frame with a photochromic nature. Yet another method of providing a frame of the present invention comprises extruding a suitable prepolymer having a selected photochromic moiety dispersed therein or extruding a suitable prepolymer and then imbibing, coating, dipping, spraying or otherwise coating it with a layer containing a selected photochromic moiety.

Figure 1:
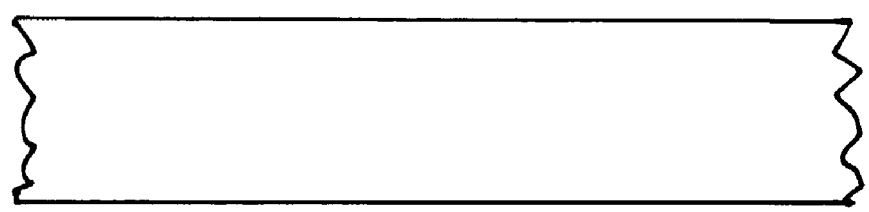
FIG. 1 is a side elevation, broken away, showing a section of a stem or nose bridge of an eyeglass frame made in accordance with a preferred embodiment of the present invention.
Figure 2:
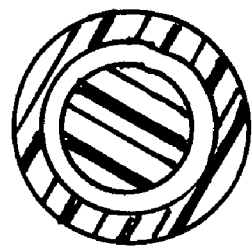
FIG. 2 is a sectional view taken along line 2—2 in FIG. 1

One preferred embodiment of this invention is a photochromic plastic eyeglass frame. Another preferred embodiment is an eyeglass frame comprising a photochromic tubing coaxially located about a portion of at least one ear frame stem as shown in FIGS. 1 and 2. Another preferred embodiment is an eyeglass frame in combination with a photochromic lens which is color complimentary thereto. In a most preferred embodiment, the eyeglass lens has exposed edge portions which absorb light from its surroundings so as to change color in response thereto as well as the frame itself.

It will be appreciated by those skilled in the art that the frames of this invention are suitable for use with a wide variety of lenses. Suitable lenses may be ophthalmic Rx or plano lenses. Plano lenses are generally of consistent thickness. Ophthalmic Rx lenses may be spherical or aspheric, monofocal, bifocal, trifocal, multifocal, invisible multi-focal or progressive, semi-finished or finished. Of course, in some cases it may be desirable to have a gradient effect in the lens, i.e., greater darkening in a top of the lens than the bottom of the lens. It may also be desirable to have a gradient effect in the frame itself which effect is within the broad scope of this invention. Preferred lenses are photochromic lenses.

As used herein, the term prepolymer includes monomeric moieties as well as oligomers, dimmers, etc. The prepolymer is polymerized and cross-linked to form a polymeric substrate. Suitable pre-polymers are well known and may be ultraviolate cross-linkable pre-polymers, radiation cross-linkable pre-polymers or thermally cross-linkable pre-polymers. Initiation of polymerization and/or cross-linking may be by ultraviolet or electron beam radiation or heat or a combination thereof.

Suitable pre-polymers for use in the molding method herein are liquid and must be placed in a desired mold before initiation of polymerization. Curing of the prepolymer is begun by heating or otherwise initiating curing as is conventional in the art Examples of suitable pre-polymers include monomers, homopolymers and copolymers of polyol(allyl carbonate) monomers, homopolymers and copolymers of polyfunctional acrylate monomers, polyacrylates, poly(alkylacrylates) such as poly(methylmethacrylate), cellulose acetate, cellulose triacetate, cellulose acetate propionate, cellulose acetate butyrate, poly(vinyl acetate), poly (vinyl alcohol), poly(vinyl chloride), poly(vinylidene chloride), polyurethanes, polycarbonates, poly(ethylene-terephthalate), polystyrene, copoly(styrene-methylmethacralate), copoly(styrene-acrylonitdrile), poly(vinylbutyral), and homopolymers and copolymers of diallylidene pentaerythritol, such as copolymers with polyol(allyl carbonate) monomers, e.g. diethylene glycol bis(allyl carbonate), and acrylate monomers. Transparent copolymers and blends of the transparent polymers are suitable as matrix materials. Preferred pre-polymers are diethlene glycol Bis (allyl carbonate), (CR-39) monomer. Of course, it is contemplated that the polymerizable pre-polymer will be a composition which may comprise other components as is conventional in the art. For example, a suitable composition may include a polymerization initiator, a cross-linking agent, a UV absorber, or other conventional additives.

Any suitable and desired molecular moiety may be imbibed or diffused or otherwise included into or in the polymeric matrix. Suitable photochromic moieties are well-known in the art and include those selected from the group consisting of anthraquinones, naphtopyrans, phhalocyanines, spiro-oxazines, chromenes, pyrans including spiropyrans and fulgides. Suitable photochromic molecules include but are not limited to those disclosed in U.S. Pat. No. 5,882,556 Mar. 16, 1999 to Perrott et al. which is specifically incorporated by reference herein. In addition to photochromic molecules, the photochromic composition may include a non-photochromic dye if it is desired to provide a tint to the lens even when the photochromic molecules are not activated. UV stabilizers and antioxidants may be added to enhance the life of the lens.

It may be desired to use two or more photochromic moieties in the polymeric matrix in order to achieve a multicolored effect. For example, one photochromic moiety could be selected to change color under certain light conditions while another photochromic moiety could also be added to the moiety to change color under different light conditions. Thus, the polymeric matrix would have one color under the first light conditions and another, different color under different light conditions. The multiple photochromic moieties could be further combined with a non-photochromic dye to impart color to the matrix under light conditions which would not activate any of the photochromic moieties or to tint or modify one or more of the colors imparted by one or more activated photochromic moieties.

Photochromic molecules can be infused or permeated into the entire substrate or into a surface layer portion of the substrate by a variety of methods. The photochromic moiety can be brought into contact with a surface or surfaces of the substrate to accomplish its permeation therein by various methods including, but not limited to, coating a solution containing the photochromic moiety onto the surface of the substrate, applying a layer of polymeric film having the photochromic moiety dissolved or suspended therein to the surface of the substrate and then heating the film near to but below the melting point of the photochromic moiety for a time sufficient to incorporate the photochromic moiety into the surface layer.

Where the substrate is to be cast or extruded, the photochromic moiety can be included in the casting mix or extruder. For example, the photochromic moiety can be added to a thermoformable plastic, which combination is then injection molded into the shape of a frame or the photochromic moiety can be added to an extrudable plastic which combination is then extruded into a plastic sheet or rod which is then stamped or cut and formed into frame parts.

Yet another method of infusing the photochromic moiety into a frame involves use of stratified dipping solution having a polar layer, for example, water, and a non-polar layer containing the photochromic moiety. The frame is dipped into the solution into contact with the nonpolar solvent which has the photochromic moiety dissolved in it and then withdrawn up through the non-polar solvent with a photochromic moiety dissolved in it. Then the treated frame or frame part is heated at a temperature high enough to cause the photochromic moiety to bind or melt and bond to the frame or frame part.

In yet another preferred embodiment of the present invention, transparent or semi-transparent frames or frame parts such as ear stems, are provided with a hollow portion in which is placed a liquid, gel, or other material comprising a photochromic moiety filling such hollow portion, thereby causing the frame to take on photochromic properties.

Further understanding of the present invention will be had from the following examples.

EXAMPLE 1

Texin thermoplastic, a product of Bayer, is mixed with a photochromic moiety. One kilogram of Texin pellets was mixed with 15 drops of mineral oil. Then 0.004 milligrams of Keystone Anilines Palatinate Purple, a photochromic moiety, was added to the Texin and oil mixture and mixed thoroughly. The plastic mixture was added to an injection molding machine with the heating zones set a 440 degree F. and then the plastic mixture was injected into a frame mold. The frame was ejected from the mold and showed excellent photochromic properties in UV light.

EXAMPLE 2

A mixture of Texin from Bayer and a photochromic moiety, Corn Yellow from Keystone Aniline, was prepared as in example #1 and then was extruded into sheet material. The sheet was then cut and milled into the shape of a frame. Upon exposure to uv light the frame turned into a deep yellow color.

EXAMPLE 3

A plastic frame was made as in Example 1 except the photochromic moiety was omitted. A mixture of SDC's 1165 urethane primer and Oxford Blue from Keystone anailine was mixed with the Oxford Blue concentration being 0.025 percent. The plastic eyeglass frame was dipped into the solution and slowly and uniformly withdrawn from it. The frame was then placed in an oven and heated at 100 Degrees C. for 30 minutes. The resultant frame shows good photochromic characteristics.

EXAMPLE 4

A mixture of SDC's 1165 urethane primer and Oxford Blue from Keystone anailine was mixed with the Oxford Blue concentration being 0.025 percent. A three peice eyeglass frame made from an extruded cellulose material was dipped into the solution and slowing and uniformly withdrawn from it. The frame was then placed in an oven and heated at 100 Degrees C. for 30 minutes. The resultant frame shows extremely good photochromic characteristics.

EXAMPLE 5

An extruded cellulose plastic eyeglass frame was imbibed with a photochromic material by mixing a dye, "Plum Red", from Keystone Anailine, in propylene glycol, 0.5 grams dye/liter of solvent, for 1 hour at 80 degrees C. After removing the frame from the imbibing solution it turned a purple color immediately upon being exposed to sunlight.

EXAMPLE 6

Silicone tubing of the size 0.070 OD with a 0.030 ID was imbibed in the solution used in example #5. The tubing shows excellent photochromic properties. Lengths of the tubing the size of the temples of a wire eyeglass frame were slipped over the wire parts of the temple and a piece was cut to cover the nose bridge. When the tubing was exposed to the sun it turned purple.

EXAMPLE 7

Silicone tubing of the size 0.070 OD with a 0.030 ID was dipped in the solution used in example #4. The tubing showed excellent photochromic properties. Lengths of the tubing the size of the temples of a wire eyeglass frame were slipped over the wire parts of the temple and a piece was cut for the nose bridge. When the frame was taken into the sun it turned blue.

EXAMPLE 8

The injection molding plastic mixture used in example #1 was used in an extruding machine setup to make tubing of the size 0.090 OD with a 0.50 ID. The tubing shows very good photochromic properties. As in Example #6 pieces of the tubing were cut and slipped over the frame parts of a metal eyeglass frame. When the frame was exposed to sunlight it activated and the frame appeared to be blue in color.

EXAMPLE 9

The frame I of example #1 was fitted with matching colored photochromic lenses. Both the frame and the lenses turned color when put under a UV light source.

EXAMPLE 10

A photochromic moiety is added to a casting resin and the resin is poured into an eyeglass frame mold. The article is cured and the frame removed from the mold.

EXAMPLE 11

A cellulose thermoset plastic eyeglass frame was imbibed with a photochromic material by mixing a dye known as "Plum Red", from Keystone Aniline, in propylene glycol, 0.5 grams dye/liter of solvent, for 1 hour at 80 degrees C. After removing the frame from the imbibing solution is turned a purple color immediately upon being exposed to sunlight.

EXAMPLE 12

The plastic three-piece rimless frame of example #4 was fitted with rimless edged plastic photochromic lenses containing the same Oxford Blue color. When the frames and lenses were worn in sunlight they turned to an aqua color. It was noted that the shirt being worn by the person modeling the eyeglasses was a lime green. The model was asked to remove the eyeglasses and hold them away from their person. The lenses became a characteristic Oxford blue color. The model was asked to wear the frames again and the same aqua color was noted.

EXAMPLE 13

The temples for a clear cellulose eyeglass frame were prepared to have a temple wire pushed into them. The wire was pushed into the temple while under heat and immediately withdrawn instead of leaving it inserted into the temple. This left a long cavity in the temple. The cavity was filled with a mixture of propylene glycol and Plum Red dye. The terminus of the long cavity was plugged with wax. The temple was put under UV light and the characteristic color of purple was noted. The other temple of the eyeglass frame was treated as the first and the frame was assembles and show very good color changing characteristic.

EXAMPLE 14

Keystone Corn Yellow Reversacal dye is mixed with cellulose propionate pellets in a ratio of 0.0004 grams per kilogram of plastic pellets. The mixture is injection molded at 205° C., with a cycle time of 30 seconds, to form eyeglass frame parts. The resultant frame parts are tumbled and polished. Then the frame parts are painted with a white translucent paint. Under indoor fluorescent or incandescent light, the frame appears to be a white color. When exposed to sunlight or UV light the frame turns yellow.

EXAMPLE 15

ChromTech PH 17 purple Photochromic dye and a red azo dye are mixed with Cellulose Propionate pellets in a ratio of 0.0004 grams per kilogram of plastic pellets. The mixture is injection molded and finished as in example 14 except the frame is not painted. The frame under indoor light has a red color and when the frame is exposed to UV or sunlight it turns a deep purple color.

EXAMPLE 16

ChromTech PH17 purple Photochromic dye and PH 16 Photochromic dye are mixed with Cellulose Propionate pellets and injected molded as in example 15. The resultant injection molded frame exhibits is clear indoors but in outside or in UV light, depending on the wavelength of the light, exhibits a grey or blue or a purple color.

What is claimed is:

1. An eyeglass frame adapted to hold at least one eyeglass lens and having at least one ear frame stem having photochromic tubing coaxially located about a portion of said ear frame stem.

2. The frame as in claim 1 wherein the frame has a nose bridge with photochromic tubing coaxially located about a portion of said nose bridge.

3. The frame as in claim 1 wherein the frame is in combination with a photochromic lens which is color complimentary thereto.

4. The frame as in claim 3 wherein said lens has exposed edge portions which absorb light from its surroundings so as to change color in response thereto.

5. The frame as in claim 1 wherein said frame has ear stems and comprises photochromic tubular elements coaxially about said ear stems.

6. The frame as in claim 1 wherein said frame comprises at least two different photochromic moieties.

7. The frame as in claim 1 wherein said frame comprises at least one non-photochromic dye.

8. A method of making an eyeglass frame comprising the step of slipping a photochromic tube coaxially over an ear stem of said eyeglass frame.

\* \* \* \* \*